2 Sheets—Sheet 1.

W. SCHENCK.

STOVE BACK.

No. 10,218. Reissued Oct. 17, 1882.

Witnesses.
Jas. E. Hutchinson.
Henry C. Hazard.

Inventor.
H. Schenck, by
Geo. S. Prindle, his Atty.

N. PETERS. Photo-Lithographer, Washington, D. C.

W. SCHENCK.

STOVE BACK.

No. 10,218. Reissued Oct. 17, 1882.

Witnesses.
Jas. E. Hutchinson.
Henry C. Hazard

Inventor.
H. Schenck, by
Geo. S. Prindle, his Atty.

N. PETERS, Photo-Lithographer, Washington, D. C.

UNITED STATES PATENT OFFICE.

WILKENS SCHENCK, OF ST. PAUL, MINNESOTA.

STOVE-BACK.

SPECIFICATION forming part of Reissued Letters Patent No. 10,218, dated October 17, 1882.

Original No. 237,450, dated February 8, 1881. Application for reissue filed September 12, 1882.

*To all whom it may concern:*

Be it known that I, WILKENS SCHENCK, of St. Paul, in the county of Ramsey, and in the State of Minnesota, did invent certain new and useful Improvements in Fire-Backs, for which Letters Patent No. 237,450 were issued to me upon the 8th day of February, 1881; which Letters Patent having been found defective, in that the specification and claim do not cover and embrace all of the original invention, as set forth in the application filed in the Patent Office on the 15th day of May, 1880, now, therefore, being desirous of reissuing said Letters Patent, herewith surrendered, I have prepared and do hereby declare that the following is a full, clear, and exact description of the said invention, reference being had to the accompanying drawings, making a part of this specification, in which—

Figure 1:
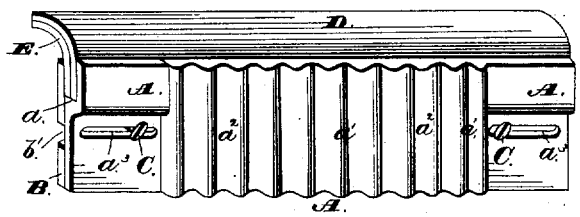
Figure 2:
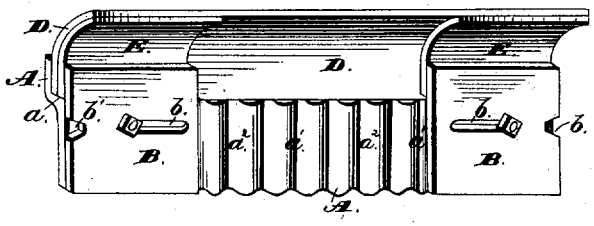
Figure 3:
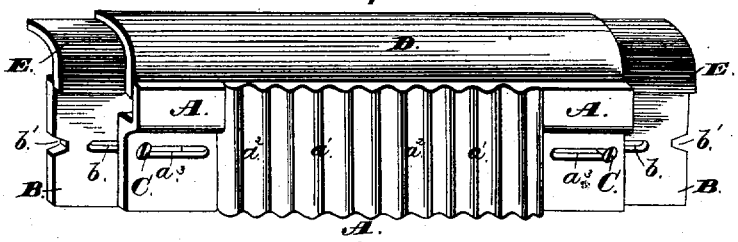
Figure 4:
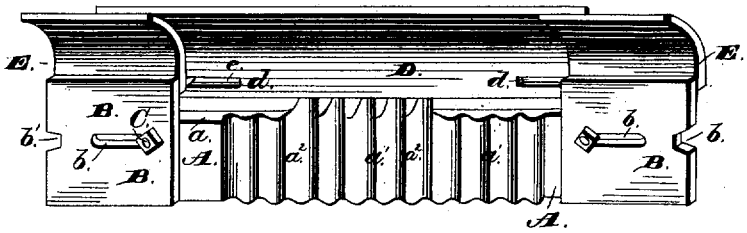
Figure 5:
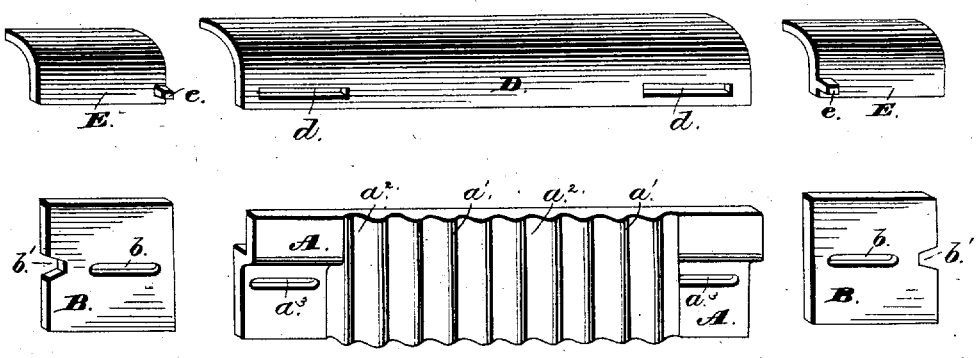
Figure 6:
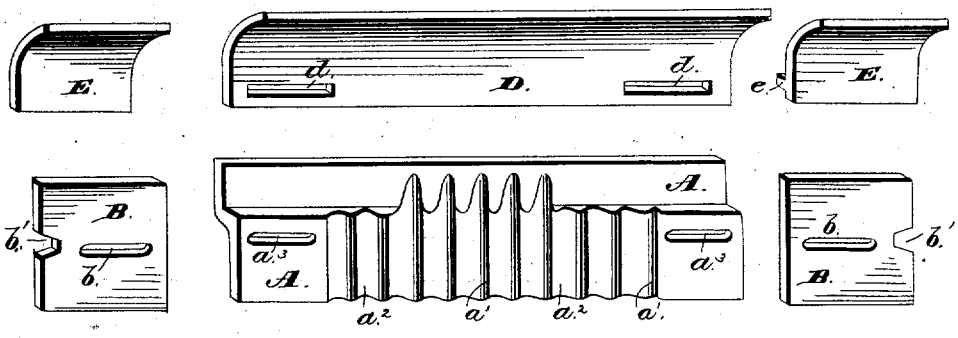

Figure 1 is a perspective view of the front side of my device contracted to its smallest dimensions. Fig. 2 is a like view of the rear side of the same. Fig. 3 is a perspective view from the front of said device when extended. Fig. 4 is a like view of the same from the rear. Fig. 5 is a perspective view from the front of the parts of said device separated from each other, and Fig. 6 is a like view of the same from the rear.

Letters of like name and kind refer to like parts in each of the figures.

In the use of cooking-stoves it has heretofore been customary to line the fuel-chambers with fire-brick, because of the ease with which the latter could be cut to fit the space to be occupied and the comparatively small expense necessary for relining fuel-chambers with such material after the original lining had become worn out. While for the reasons named fire-brick have been generally used, the material has proved very objectionable in consequence of its liability to become coated with clinker, the rapid accumulation of which latter has rendered necessary the employment of larger fuel-chambers than would otherwise be necessary. The objections found to exist in the use of fire-brick linings do not apply to cast-iron linings; but against the use of the latter is the difficulty experienced in fitting the part to place, more especially after a stove has been used and its plates have become warped.

To obviate this difficulty and render easy and practicable the fitting of a cast-iron lining to any of the usual forms and sizes of stoves is the design of my invention, which consists principally in a stove-lining composed of two central overlapping plates capable of relative vertical adjustment, and four overlapping end plates capable of relative vertical adjustment and of lateral adjustment with relation to said central plates, whereby the vertical and longitudinal dimensions of said stove-lining may be increased or diminished, substantially as and for the purpose hereinafter specified.

It consists, further, in the construction of the lower center plate and its combination with its connecting end plates, substantially as and for the purpose hereinafter shown.

It consists, further, in the combination of the lower center plate, lower end plates, and upper center plate, substantially as and for the purpose hereinafter set forth.

It consists, finally, in the construction and combination of the center plates and end plates, substantially as and for the purpose hereinafter shown and described.

In the annexed drawings, A represents the main plate of my lining, which has a height equal to about two-thirds the height and a length slightly less than that of the minimum fuel-chamber to which it is to be applied. Within the rear face of said plate is provided a rabbet, *a*, which is formed by a horizontal offset, while the central portion is strengthened by vertical ribs $a'$, that upon each side come opposite to corresponding grooves, $a^2$, and give to said part a corrugated form.

Fitted upon the rear face at each end of the plate A is a plate, B, that corresponds therewith in height, and has a length equal to about one-third the length of the same. Said plate A is provided with a longitudinal slot, $a^3$, near each end, at a point just below the offset *a*, and within each of said plates B is formed a similar slot, *b*, which coincides with said slot $a^3$, and enables said plates to be secured together by means of a bolt, C, that is passed through the same. Said arrangement permits said plates B to be moved longitudinally within the limits of said slots.

Within the offset *a* is placed the lower edge of a plate, D, which corresponds in length to the plate A, and has a width substantially equal to the same. The upper portion of said plate D has an upward and rearward curve to adapt it to the form of the rear side of an ordinary fuel-chamber. The plate D has a thickness equal to about one-half the width of space between the upper portions of the plate A and end plates, B, formed by the offset *a*, and within such space, at each end and in rear of said plate D, is a plate, E, which corresponds in vertical dimensions and in form with the latter, and has a length substantially equal to that of said end plate, B. The plates E are capable of being moved longitudinally and vertically, and are each held in vertical position with relation to the plate D by means of a horizontal groove, *d*, which is formed in the rear side, near the lower edge of the latter, and a spur, *e*, that projects from the front face of said plate E into said groove. When greater vertical dimensions of the lining are required the bolts C are loosened and the plates E are then raised to the desired height, as seen in Figs. 3 and 4, after which said bolts are again tightened, so as to confine said plates in position.

A notch, *b'*, provided in the outer end of each plate B for the purpose of engagement with the usual lugs that are provided at the corners of a fuel-chamber, completes my device, the operation of which is as follows, viz: The normal positions of parts are as seen in Figs. 1 and 2, the end plates being moved inward and the upper plates moved downward to their limits of motion. In applying the device the bolts C are loosened, the lining placed in position within a fuel-chamber, and the plates D and E moved upward to position, and said plates E and the plates B are then moved laterally outward to place, after which said bolts are tightened, so as to bind said parts firmly together.

Within the limit of its expansibility the lining can be easily and quickly applied to and caused to fill the space provided therefor in a fuel-chamber, no cutting or fitting being necessary in adjusting it to place.

Having thus fully set forth the nature and merits of my invention, what I claim as new is—

1. A stove-lining composed of two central overlapping plates capable of relative vertical adjustment, and four overlapping end plates capable of relative vertical adjustment and of lateral adjustment with relation to said central plates, whereby the vertical and longitudinal dimensions of said stove-lining may be increased or diminished, substantially as and for the purpose specified.

2. The plate A, provided with the offset *a*, the corrugations $a'$ and $a^2$, and the horizontal slots $a^3$, in combination with the plates B, having the horizontal slots *b*, and with the bolts C, substantially as and for the purpose shown.

3. In combination with the plates A and B, constructed and united as shown, the plate D, fitting between said plates and adapted to be moved vertically, substantially as and for the purpose set forth.

4. The hereinbefore-described lining, consisting of the plate A, provided with the offset *a* and slots $a^3$, the plates B, having the slots *b*, the plate D, provided with the grooves *d*, the plates E, having each a spur, *e*, and the screws C, passing through said slots $a^3$ and *b*, all constructed and combined substantially as and for the purpose specified.

In testimony that I claim the foregoing I hereunto set my hand this 19th day of July, 1882.

WILKENS SCHENCK.

Witnesses:
WM. LOUIS KELLY,
WM. LOUIS KELLY, Jr.